United States Patent [19]

Bakx

[11] Patent Number: 5,631,892
[45] Date of Patent: May 20, 1997

[54] OPTICAL STORAGE DISC SCANNER WITH IMPROVED SCANNER POSITIONING

[76] Inventor: Johannes L. Bakx, Groenewoudseweg 1, Eindhoven, Netherlands

[21] Appl. No.: 371,047

[22] Filed: Jan. 10, 1995

Related U.S. Application Data

[63] Continuation of Ser. No. 40,056, Mar. 30, 1993, abandoned.

[30] Foreign Application Priority Data

May 6, 1992 [NL] Netherlands .................... 9200808

[51] Int. Cl.$^6$ ......................................... G11B 7/00
[52] U.S. Cl. ................................ 369/124; 369/54
[58] Field of Search .................. 369/44.26, 44.32, 369/44.35, 44.36, 44.41, 47, 48, 50, 54, 58, 124

[56] References Cited

U.S. PATENT DOCUMENTS 4,471,477  9/1984  Bierhoff .
4,999,825  3/1991  Raaymakers et al. .
5,023,856  6/1991  Raaymakers .

FOREIGN PATENT DOCUMENTS 0265984  5/1988  European Pat. Off. .
0325330  7/1989  European Pat. Off. .

*Primary Examiner*—Georgia Y. Epps
*Assistant Examiner*—P. W. Huber

[57] ABSTRACT

An optical writing and/or reading device. A radiation source (10) generates a radiation beam (11). This radiation beam (11) is directed by an optical system onto a servotrack (4) of a rotating record carrier (1). The beam reflected via the record carrier is passed on to a push-pull detector (12). The servotrack has a periodical radial wobble whose frequency is modulated in accordance with a position-information signal. A signal-regaining circuit (17) regains the position-information signal from the push-pull signal. A balancing circuit (41, 42; 50, 51) adjusts a weighting the ratio between the detection signals which contribute to the difference signal. The DC component in the adapted push-pull signal is derived by means of a low-pass filter (44). In dependence upon the determined DC component, a circuit (45) sets the weighting ratio to a value at which the determined DC component is substantially zero.

4 Claims, 2 Drawing Sheets

OPTICAL STORAGE DISC SCANNER WITH IMPROVED SCANNER POSITIONING

This is a continuation of application Ser. No. 08/040,056, filed Mar. 30, 1993 now abandoned.

BACKGROUND OF THE INVENTION

The invention relates to an optical writing and/or reading device comprising a radiation source for generating a radiation beam, an optical system for directing the radiation beam onto a radiation-sensitive detector via a record carrier, the radiation beam producing a radiation spot on the record carrier, means for scanning a servotrack on the record carrier by the radiation spot in a longitudinal direction, the detector comprising means for deriving a first and a second detection signal which are indicative of the power in a first and a second part, respectively, within the cross-section of the radiation beam received by the detector, said two parts being located at both sides of an imaginary line whose direction corresponds to the track direction, signal combination means for deriving a difference signal which is indicative of the difference between the two detection signals, said device further comprising an information-regaining circuit for regaining information from the difference signal.

A device of this type is known from EP-A-0265984, to which U.S. Pat. No. 5,023,856 corresponds. The device described in this Application is a device for recording and/or reading information in/from a servotrack having a periodical radial track wobble. The frequency of the wobble is modulated in accordance with a longitudinal position-information signal. As a result of this track wobble the difference signal has an FM modulation which is free from DC and which represents the position-information signal. This position-information signal is regained by means of a signal-regaining circuit in the form of an FM demodulator. In this way position information can be regained from the push-pull signal when the recorded information is being read, which is desirable for an efficient control. Also during recording information, in which the intensity of the radiation beam is modulated, information about the position of the scanned potion of the servotrack can be derived. For a reliable regaining of the position-information signal it is desirable that the wobble/noise ratio in the difference signal is sufficiently high. It has been found that a small deviation in the positioning of the detector already leads to a considerable deterioration of the wobble/noise ratio.

SUMMARY OF THE INVENTION

It is an object of the invention to provide means ensuring that the wobble/noise ratio remains sufficiently high, also in the case of a positioning error, for reliably regaining the information represented by the difference signal.

According to the invention, this object is achieved by means of a device as described in the opening paragraph, which is characterized in that the device comprises a balancing circuit for adjusting a weighting ratio between the detection signals which contribute to the difference signal, means for determining the DC component value in the difference signal derived from the weighted detection signals, and means for setting the weighting ratio to a value at which the DC component value of the difference signal is substantially zero.

The invention is also based on the recognition that the additional noise component which results from the positioning error is proportional to the sum of the detection signals. By adjusting the ratio with which the detection signals contribute, it is thus possible to compensate for the additional noise resulting from the positioning error. Due to the fact that the FM-modulated position-information signal does not comprise a DC component and the additional noise component caused by the positioning error does comprise a DC component, a full compensation of the additional noise can be realised by setting the ratio to a value at which the DC component in the adapted difference signal is zero.

These and other aspects of the invention will be apparent from and elucidated with reference to the embodiments described hereinafter.

BRIEF DESCRIPTION OF THE DRAWING

In the drawings

FIG. 1b is a sectional view of a portion of the record carrier of FIG. 1a,

DESCRIPTION OF THE PREFERRED EMBODIMENT

Figure 1A:
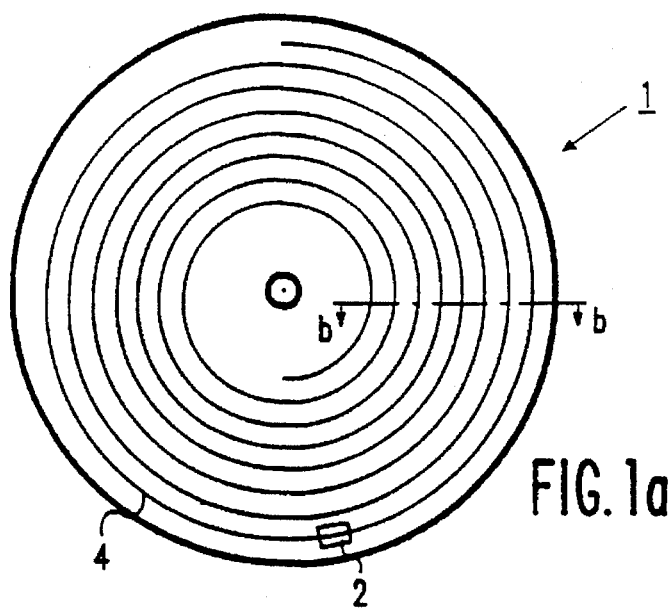
FIG. 1a shows a plan view of an optical record carrier of an inscribable type.
Figure 1B:
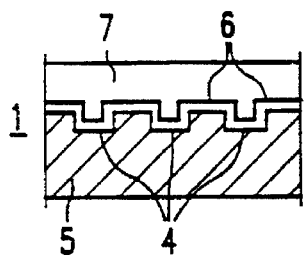
Figure 1C:
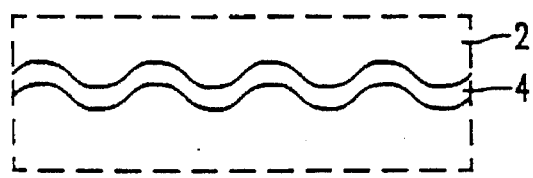
FIG. 1c is a plan view on an enlarged scale of a wobbled servo track of the record carrier of FIG. 1a, FIG. 2 shows an embodiment of a device according to the invention.

FIG. 1a is a plan view of a record carrier 1 of an inscribable type. FIG. 1b shows a portion of a cross-section of the record carrier, taken on the line b—b. The record carrier 1 comprises a transparent substrate 5 which is provided with a radiation-sensitive layer 6 coated with a protective coating 7. The record carrier 1 has a spiral servotrack 4 in the form of a groove in the substrate. The servotrack has a track modulation in the form of a periodical radial excursion, also referred to as radial wobble. A portion 2 of the track 4 is shown on a larger scale in FIG. 1c. By means of modulating the frequency of the wobble a position-information signal can be recorded in the servotrack. For a detailed description of the afore-mentioned record carrier reference is made to EP-A 0,265,984, and EP-A 0,325,330 to which U.S. Pat. No. 4,999,825 corresponds, which documents are herein incorporated by reference.

Figure 2:
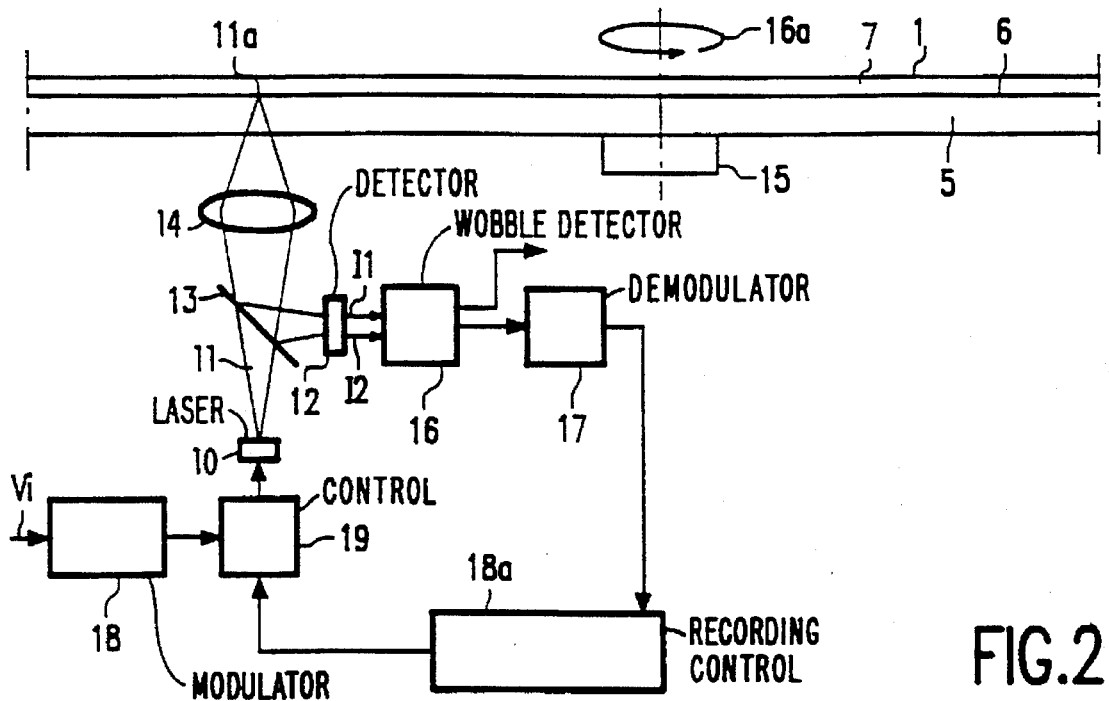

FIG. 2 shows an optical writing and/or reading device according to the invention for recording and/or reading information in/from the servotrack 4 of the record carrier 1. The device comprises a radiation source 10, for example, in the form of a semiconductor laser. The radiation source 10 generates a radiation beam 11 which is directed onto the servotrack 4 of the record carrier by means of an optical system comprising, inter alia, a focusing objective 14. The radiation beam 11 produces a small radiation spot 11a on the record carrier 1. In order that this scanning spot 11a scans the servotrack 4, the record carrier 1 is rotated about a shaft 16a by a drive motor 15 in the conventional manner. The radiation beam 11 is reflected by the record carrier 1 and the projected and reflected radiation beams are separated from each other by means of a beam splitter 13, for example a partially transparent mirror. The reflected radiation beam is passed on to a detector 12. The detector 12 is a radial push-pull detector of a conventional type. In such a push-pull detector the power is compared in two parts of the cross-section. These two portions are located at opposite sides of an imaginary line. Desirably, the average position of the centre of the reflected beam lies on this line. The direction of this line corresponds to the track direction at the location of the scanning spot.

Figure 3:
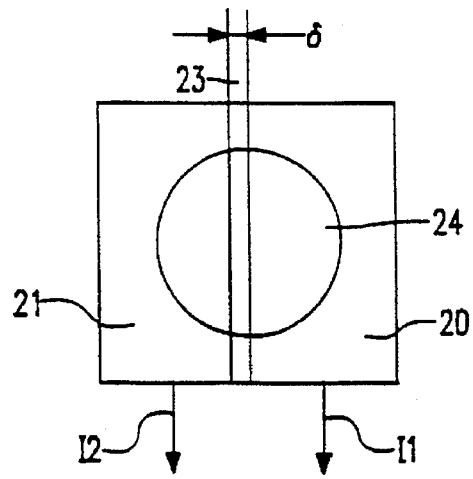
FIG. 3 shows the radiation-sensitive surface of a push-pull detector.

FIG. 3 shows the radiation-sensitive surface of an embodiment of the detector 12. The radiation-sensitive surface is divided into two parts 20 and 21. The interface between these parts 20 and 21 is denoted by a line 23 which has a direction corresponding to the track direction. The detector 12 comprises two sub-detectors each detecting the radiation power in one of the two portions 20 and 21 of the radiation-sensitive surface. The sub-detectors generate photocurrents I1 and I2 which are proportional to the power of the radiation incident on the portions 20 and 21. The difference between the photocurrents I1 and I2 is a measure of the position of the centre of the scanning spot on the record carrier with respect to the centre of the servotrack. This difference may be used as a tracking error signal in a conventional manner to adjust the radial position of the scanning spot in such a way that the centre of the scanning spot substantially tracks the centre of the servotrack. However, it is to be noted that the tracking can also be realised in one of many other conventional manners, for example by means of a three-spot tracking system. The signal component, caused by the wobble, in the difference between the photocurrents I1 and I2 is beyond the tracking bandwidth so that tracking will not be capable of reacting to this signal component. Thus this signal component is independent of signals used for tracking. A signal corresponding to this signal component is derived from the photocurrents I1 and I2 by means of a circuit 16. This signal will hereinafter be briefly referred to as wobble signal. This wobble signal represents the position-information signal which is fixed by the FM-modulated wobble of the servotrack. An information-regaining circuit 17 in the form of an FM demodulator regains the position-information signal from the wobble signal. This position-information signal may be applied, for example to a control unit 18a for controlling the recording operation, as described in the previously mentioned European Patent Applications.

The device shown in FIG. 2 may be used in a recording mode and in a reading mode. For recording purposes, the device is provided with a signal processing circuit 18 for converting the signal Vi to be recorded into a modulated signal which is better suitable for recording than the original signal Vi. The circuit 18 may comprise, for example an EFM modulator as is commonly used for recording CD signals. The modulated signal at the output of circuit 18 is applied to a control circuit 19 for the radiation source 10. The control circuit 19 is of a conventional type which modulates the power of the radiation beam 11 generated by the radiation source 10 in such a way that an information pattern corresponding to the modulated signal is provided in the scanned portion of the record carrier.

The information pattern thus provided can be read when the device is operated in the reading mode. In the reading mode the power of the radiation source 10 is set to a constant value which is too low to realise a change in the recording layer 6.

In the reading mode the photocurrents I1 and I2 supplied by detector 12 comprise a signal component which is produced by the information pattern in the scanned potion of the servotrack 4. This signal component constitutes an interference component in the wobble signal. For reliably regaining the position-information signal from the wobble signal, it is important that the ratio between the signal power of the wobble component and the signal power of the interference signal is efficiently large. This ratio will hereinafter be briefly referred to as W/N ratio. It has been found that the positioning of the detector has a great influence on the W/N ratio, as will hereinafter be explained in greater detail.

In FIG. 3 the reference numeral 24 denotes a radiation spot which is produced by the reflected radiation beam on the detector 12. The deviation between the centre of the radiation spot 24 and the interface 23 between the radiation-sensitive portions of the sub-detectors is denoted by $\delta$. The influence of the deviation $\delta$ on the photocurrents I1 and I2 will be described hereinafter.

For the photocurrents I1 and I2 it holds that $$I1 = eA_1S_1$$

$$I2 = eA_2S_2$$

in which:

$S_1$ is the signal component in I1 which is produced by the wobble, $S_2$ is the signal component in I2 which is produced by the wobble.

$A_1$ is the surface of the spot 24 incident on part 20 of the radiation-sensitive surface of the detector, $A_2$ is the surface of the spot 24 incident on part 21 of the radiation-sensitive surface of the detector, e is the signal component produced by the information pattern provided.

The values $A_1$ and $A_2$ are dependent on the deviation $\delta$. For these values it holds that:

$$A_1 = A(1+\delta)$$

$$A_2 = A(1-\delta)$$

The wobble signal PP corresponds to the difference between the photocurrents I1 and I2. The following relation then holds for the wobble signal PP:

$$PP = I1 - I2 = eA(S_1 - S_2) + e\delta A(S_1 + S_2)$$

As is apparent from the foregoing equation, the wobble signal PP has an additional interference component which is proportional to the deviation $\delta$.

This additional interference component may be removed from the wobble signal by subtracting the photocurrents with different weighting factors from each other when determining the wobble signal, as is shown in the following equation $$PP^* = (1-\epsilon)I1 - (1+\epsilon)I2 = PP - \epsilon(I1+I2)$$

In this equation PP* is the adjusted, or balanced wobble signal.

The adjustment can be obtained by once setting such a balancing during the assembly of the device that the additional interference component in the balanced wobble signal is eliminated.

The drawback thereof is that the balancing is no longer correctly set after some time due to parameter changes in the optical system.

A device in which the balancing is automatically adapted in the case of changing parameters is therefore preferred.

If the uninterfered wobble signal is a DC-free signal, as is obtained with the record carrier described in said Patent Specifications, the DC component in the balanced wobble signal can be determined during operation and the balancing can be varied in dependence upon the detected DC component in such a way that the DC component is maintained at a value which is substantially zero.

Figure 4:
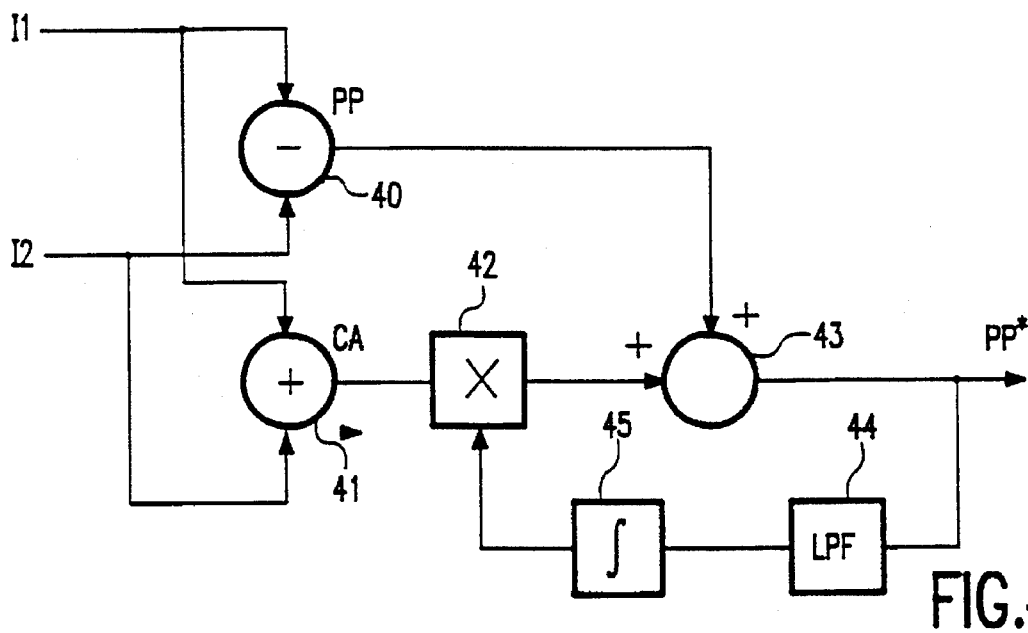
FIGS. 4 and 5 show embodiments of circuits for use in the device according to the invention.

An embodiment of the circuit 16 with which this is realised is shown in FIG. 4. The circuit 16 shown in this Figure comprises a differential amplifier 40 for determining the wobble signal PP from the photocurrents I1 and I2. The circuit 16 further comprises a summing amplifier 41 for generating a signal CA which is indicative of the sum of the photocurrents I1 and I2. The signal CA is applied to a first input of a multiplier 42. A setting signal Vb is applied to a second input of the multiplier 42. An output of the multiplier 42 supplies a signal which is proportional to the product of the signals received at its inputs. The output signal of the multiplier 42 is applied to a first input of a summing circuit 43. The signal PP is applied to a second input of the summing circuit 43. The balanced wobble signal PP* can be derived from the output of the summing circuit. To determine the DC component in the balanced wobble signal PP*, the circuit comprises a low-pass filter 44, an input of which is coupled to the output of the summing circuit 43. It is to be noted that circuits other than a low-pass filter may alternatively be used for determining the DC component. The output of the low-pass filter 44 supplies a signal which is indicative of the DC component in the balanced wobble signal PP*. The output signal of the low-pass filter 44 is applied to a circuit 45 which, in dependence upon the sign of the DC component, adapts the signal value of the setting signal in a direction in which the DC component in the balanced wobble signal PP* decreases. The circuit 45 may be, for example an integrator 45. However, other circuits are alternatively possible.

Figure 5:
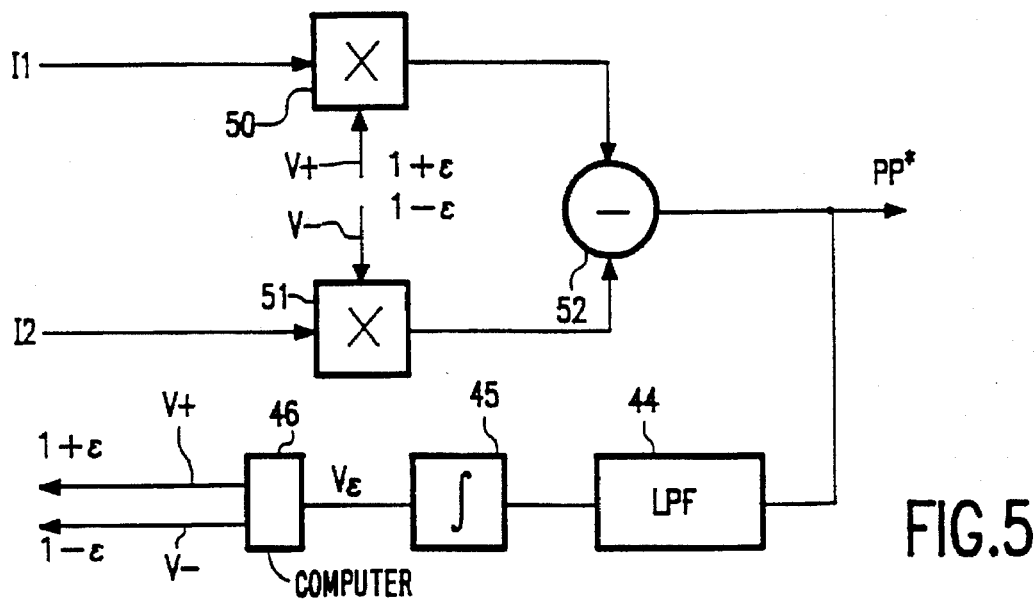

FIG. 5 shows a further embodiment of the circuit 16 in which the components which are identical to those in the embodiment shown in FIG. 4 have the same reference numerals. In the embodiment of FIG. 5 the photocurrents I1 and I2 are applied to inputs of a multiplier 50 and a multiplier 51, respectively. A correction signal V+ having a signal value corresponding to (1+ε) is applied to a second input of the multiplier 50, so that a signal having a signal value (1+ε)I1 can be derived from the output of the multiplier 50. A correction signal V− having a signal value which is equal to (1−ε) is applied to a second input of multiplier 51, so that a signal having a signal value which is equal to (1−ε)I2 can be derived from the output of the multiplier. The output signals of the multipliers 50 and 51 are applied to a differential amplifier 52 for determining the difference between these signals. The balanced wobble signal PP* can be derived from the output of the differential amplifier. The low-pass filter 44 again determines the DC component in the balanced wobble signal PP*.

Dependent on the DC component which has been determined, the signal value ε of a signal $V_\epsilon$ is adjusted. The signals V+ and V− are derived in a conventional manner from the signal $V_\epsilon$ by means of a computing circuit 46. By adjusting the signal value of $V_\epsilon$ it is achieved that the DC component in the balanced wobble signal PP* is maintained at a value which is substantially zero.

In the foregoing, the balancing of the wobble signal has been described during reading of the information recorded in the servotrack 4. This balancing compensates for the additional interference component in the wobble signal, which component is produced by the information pattern in the ease of an incorrect positioning of the detector 12.

It is to be noted that the invention is particularly advantageous when reading the position- information signal from the inscribed portions of the servotrack. However, the invention can also be used for removing the interference component which is caused during recording by the modulation of the light beam power. However, practice has proved that the interfering influence during recording is lower than during reading.

The invention is not limited to the embodiments described hereinbefore. It is particularly to be noted that push-pull detectors of a different type can be used instead of the push-pull detector 12 described.

I claim:

1. An optical scanner for scanning a record carrier having a track defining a longitudinal tracking direction, wherein the track has an asymmetric property transverse to the longitudinal tracking direction, the asymmetry corresponding to an information signal, and the scanner comprises:

a radiation source for generating a radiation beam, a radiation-sensitive detector having first and second portions located on opposite sides of a line corresponding to the longitudinal tracking direction, and means for deriving a first and a second detection signal which are indicative of the power of radiation impinging on said first and second portions respectively, an optical system for directing said radiation beam, via said record carrier, onto said detector, said radiation beam producing a radiation spot on said record carrier, means for causing said radiation spot to scan said track on said record carrier in the longitudinal tracking direction, signal combination means for deriving a difference signal indicative of the difference between said first and second detection signals, and an information regaining circuit for deriving information defined by said difference signal, characterized in that the means for causing operates independently of said difference signal, and the signal combination means further comprises:

a balancing circuit for weighting the respective contributions of said first and second detection signals to said difference signal according to a weighting ratio, means for determining the DC component value in the difference signal derived from the weighted first and second detection signals, and means, operable while said means for causing is operative, and responsive to the DC component value in the difference signal determined by said means for determining, for setting said weighting ratio to a value at which the DC component value is substantially zero.

2. A scanner as claimed in claim 1, wherein the asymmetry is a periodical wobble of the track, and the information signal represents longitudinal position along the track, characterized in that the information-regaining circuit comprises a demodulator for providing a longitudinal position information signal.

3. An optical scanner for scanning a record carrier having a servo track, comprising:

a radiation source for generating a radiation beam, a radiation-sensitive detector having first and second portions located on opposite sides of a line corresponding to the servo track direction, and means for deriving a first and a second detection signal which are indicative of the power of radiation impinging on said first and second portions respectively, an optical system for directing said radiation beam, via said record carrier, onto said detector, said radiation beam producing a radiation spot on said record carrier, means for causing said radiation spot to scan said servo track on said record carrier, said means for causing comprising a tracking servo which includes means for producing a tracking error signal, signal combination means for deriving a difference signal indicative of the difference between said first and second detection signals, and an information regaining circuit for deriving information defined by said difference signal, characterized in that the signal combination means is independent of said means for causing, and the signal combination means further comprises:

a balancing circuit for weighting the respective contributions of said first and second detection signals to said difference signal according to a weighting ratio, means for determining the DC component value in the difference signal derived from the weighted first and second detection signals, independent of said tracking error signal and means, operable while said means for causing is operative, and responsive to the DC component value in the difference signal determined by said means for determining, for setting said weighting ratio to a value at which the DC component value is substantially zero.

4. A scanner as claimed in claim 3, characterized in that said information re-gaining circuit comprises a demodulator for providing a position information signal derived from a periodical wobble of said servo track.

* * * * *